Patented Nov. 24, 1936

2,061,617

UNITED STATES PATENT OFFICE 2,061,617

SULPHONIC ACID DERIVATIVES OF ALIPHATIC HYDROCARBONS USEFUL AS WETTING AND CLEANSING AGENTS

Frederick Baxter Downing, Carneys Point, N. J., and Richard Gesse Clarkson, Wilmington, Del., assignors to E. I. du Pont de Nemours & Company, Wilmington, Del., a corporation of Delaware No Drawing. Application April 15, 1932, Serial No. 605,550

3 Claims. (Cl. 260—156)

This invention relates to chemical compounds, more particularly surface active substances, and processes for the manufacture thereof.

It is known there is a wide demand in the various industries for surface active compounds which possess cleaning, wetting, and dispersing properties and at the same time are stable in aqueous acidic, neutral and alkaline media. Surface active compounds possessing cleaning, wetting and dispersing power in certain kinds of liquids are well known. Thus, soaps such as the sodium salts of the higher fatty acids are excellent detergent and wetting agents in soft water and for this reason find a wide application in laundering. Soaps are not soluble in acidic solutions, however, since the alkali metal salts of the fatty acids are converted into the insoluble fatty acids. Moreover, in hard water the alkali metal salts of the fatty acids are precipitated as the insoluble alkaline earth metal salts such as those of calcium, magnesium and the like.

While other surface active substances have been prepared such as, for example, the Turkey red oils (that is, the reaction products of castor oil and concentrated sulphuric acid at relatively low temperatures), which are more soluble than soaps in acid solutions and hard water, these substances are generally much less effective detergents than the soaps they are designed to replace.

It is an object of the present invention to produce new compounds which are highly surface active, are water-soluble, and possess good wetting and detergent power even in relatively strongly alkaline or acidic solutions and which, therefore, are adapted for use in acidic, neutral or alkaline baths in a variety of industries. A further object is the production of surface active compounds having relatively soluble alkaline earth metal salts and which, therefore, are adapted for use in hard water. A still further object of the invention is the provision of new and improved processes for producing the above described compounds. Another object is the production of these surface active compounds directly in a high state of purity. A further object is the production of compounds of the character described by a process involving a series of reactions which proceed with great smoothness and with almost theoretical yields. Other objects will appear hereinafter.

These objects are accomplished according to this invention whereby products especially useful as wetting, detergent, and dispersing agents are produced by the following reactions: (I) unsaturated aliphatic hydrocarbons containing eight or more carbon atoms and having a double bond at the end of the chain are reacted with an oxygen derivative of sulphur such as, for example, sulphur trioxide, a halogen sulphonic acid, acetyl sulphuric acid, oleum, sulphuryl chloride, or mixtures of two or more of the foregoing substances; and (II) the products of reaction (I) are treated with a hydrolyzing agent.

Reaction (I) may be effected with or without a catalyst and, if desired, in a solvent or suspension medium. When no catalyst is employed, upon hydrolysis and neutralization of the product, an immiscible oil separates and is removed from the reaction mixture by any convenient method. The remaining solution is then evaporated or otherwise treated in any suitable manner to obtain the desired product. When it is carried out in the presence of a suitable catalyst, no oil separates upon hydrolysis and neutralization of the product. Moreover, the yields obtained are much higher and the efficacy of the product is better when a suitable catalyst is employed than is the case when no catalyst is used. Whether or not reaction (I) is effected in the presence of a catalyst, however, the final products have been found to be highly surface active, soluble in both hard and soft water, and to give solutions of excellent detergent and wetting power stable to the addition of even strong acids or alkalies.

While the invention is susceptible of considerable variation and modification in the manner of its practical application, particularly as regards the kind and proportions of the reactants and the exact method of procedure, the following examples, in which the parts are by weight, will serve to illustrate some of the products falling within the invention and how they may be prepared.

Example I

Thirty parts of a mixture of olefines (B. P. 245–260° C.) consisting substantially of 1,2-hexadecylene, prepared by dehydrating the appropriate fraction of primary alcohols (B. P. 190–225° C. at 65 mm.) obtained from the hydrogenation of coconut oil, were dissolved in 125 parts of carbon tetrachloride and the mixture cooled to 0° C. Twenty parts of chlorsulphonic acid were then added slowly with vigorous stirring and the mixture kept cold for three hours. The reaction liquid was then treated with water and neutralized with 20% sodium hydroxide solution and 6 parts excess sodium hydroxide added. The carbon tetrachloride was steam distilled off and recovered and the residual liquid boiled for 30 minutes. The product was neutralized with 10% sulphuric acid and the immiscible oil which formed in the mixture was separated. The aqueous solution was then evaporated to a thick reddish brown oil clearly soluble in water giving solutions of very good wetting power and stable to the addition of mineral acids, alkalies and salts of alkaline earth metals.

*Example II*

A solution was prepared from 40 parts of liquid sulphur dioxide and 20 parts of a mixture of olefines (B. P. 205–220° C.) consisting substantially of 1,2-dodecylene obtained by dehydrating a mixture of primary alcohols, in which primary lauryl alcohol was the chief constituent. To this solution was added slowly with repeated stirring a solution of 10 parts sulphur trioxide in 40 parts liquid sulphur dioxide. The resultant product was stirred for about 12 hours at −12° C. The sulphur dioxide was then removed by allowing the reaction product to warm to room temperature. The residual liquid was treated with water and then 23 parts of sodium hydroxide added. The resultant liquid was boiled for an hour and neutralized with 10% sulphuric acid and the oily layer separated. The aqueous solution was evaporated to dryness giving a brown oil readily soluble in water to give solutions of considerable wetting power and stable to acids and alkalies and alkaline earth salts.

*Example III*

A solution of 20 parts of 1,2-tetradecylene (B. P. 230–245° C.) prepared by dehydrating the corresponding alcohol, in 40 parts carbon tetrachloride, was prepared and cooled to +5° C. A solution of 15 parts of sulphuryl chloride in 15 parts of carbon tetrachloride was added slowly with vigorous stirring. The mixture was kept cold and stirred for four hours. The product was then diluted with water and 20 parts of sodium hydroxide added. The carbon tetrachloride was steam distilled off and recovered and the aqueous liquid boiled for 45 minutes. It was then neutralized with 10% sulphuric acid and the oily layer separated. The remaining solution was evaporated yielding a reddish-brown oil, readily soluble in water to give nearly colorless solutions of great wetting power.

*Example IV*

Twenty parts of 1,2-octadecylene obtained by dehydrating primary n-octadecyl alcohol were dissolved in about 80 parts of carbon tetrachloride. Approximately one-tenth part of pyrolusite was suspended in the solution which was then cooled to about 0–5° C. Twelve parts of chlorsulphonic acid were added slowly to the mixture with agitation, the resultant mixture being maintained at the above low temperature for a period of about two more hours. At the end of this time the temperature was allowed to rise to about 20–25° C. After standing at this temperature for 12–14 hours the liquid was poured into water, neutralized with 20% sodium hydroxide solution and about 6 parts of excess sodium hydroxide added. The product was boiled for an hour to hydrolyze it and to remove carbon tetrachloride. The resultant solution was neutralized with 10% sulphuric acid solution and then evaporated to a small volume. The product was isolated by precipitating the inorganic salts with an excess of ethyl alcohol, filtering the alcohol solution and evaporating off the alcohol and water. The resultant product was a light brown oil, clearly soluble in water, possessing high surface activity and characterized by unusual stability in combination with marked wetting, cleaning, and dispersing power even in strongly acid or alkaline solutions. The weight of product obtained in this way was 32.5 parts.

The foregoing procedure was carried out a number of times without the catalyst, all other conditions of operation and proportions of materials being the same. In marked contrast with the reaction where the catalyst was used, after neutralization of the hydrolyzed product with the 10% sulphuric acid solution an oily liquid separated and was removed from the product. The remaining solution was then evaporated to a small volume and extracted with alcohol as above described. The average yield of the product was 23.0 parts. In other words, the average increase in yield obtained from the reaction in the presence of a catalyst was about 41%. Actually the increase in yield is probably greater than this since the products obtained by the use of catalysts were purer than those obtained without catalysts. This was shown by the fact that the aqueous solutions of the products obtained with catalysts were perfectly clear while solutions of the products obtained without a catalyst were cloudy. The cloudiness indicated incomplete removal of the by-product oily material formed during the hydrolysis, this oily substance then being emulsified by the action of the sulphonic acids giving solutions of the resultant product a cloudy appearance. Furthermore, the products obtained from the reaction with a catalyst were slightly more effective wetting agents than the products obtained without catalysts, possibly indicating the presence in the latter of an inert diluent or of a less active detergent.

*Example V*

1,2-octadecylene was treated with chlorsulphonic acid and the resultant product was hydrolyzed as described in Example IV except that one-tenth part of iodine was used as a catalyst instead of pyrolusite. It was noted that no separation of oil occurred after the addition of the 10% sulphuric acid solution. The yield of product obtained by extraction with alcohol was about 30.8 parts. An aqueous solution of the product was perfectly clear and possessed excellent detergent and wetting properties. The product was also stable and possessed marked cleaning, dispersing and penetrating power in solutions containing more than 10% of hydrochloric acid and in solutions containing more than 10% of sodium hydroxide. In fact, no tendency towards instability was noticed in any alkaline, neutral or acidic aqueous solutions.

*Example VI*

A mixture of olefines containing 11.5 parts of the dodecylene described in Example II and 18.5 parts of the tetradecylene described in Example III was reacted with a solution of 14 parts of sulphur trioxide in 30 parts of liquid sulphur dioxide in the presence of about 0.1 part of mercurous sulphate. The reaction mixture was stirred for about 12 hours at −12° C. and the temperature then allowed to rise slowly to room temperature.

The product was poured into water, neutralized with 20% sodium hydroxide solution and about 5 parts of excess sodium hydroxide added. The resultant product was boiled about an hour to hydrolyze it, after which the solution was neutralized with 10% sulphuric acid solution, evaporated to a small volume and then extracted with alcohol as described in Example IV. No oily liquid separated at any time after the treatment with the hydrolyzing agent. The product was characterized by excellent wetting, cleaning and dispersing properties. The yield was about 21 parts, whereas the yield obtained in carrying out a similar reaction without the catalyst was only about 16 parts.

The unsaturated hydrocarbons employed in accordance with the present invention may be any aliphatic unsaturated hydrocarbons containing eight or more carbon atoms and having a double bond at the end of the chain. Mixtures of such hydrocarbons may be employed. Or, the starting materials may be mixtures containing unsaturated hydrocarbons of the character above described and olefines in which the double linkage is not at the end of the chain. In general, the results are more desirable, however, the larger the proportion of hydrocarbons having a double linkage at the end of the chain. The aliphatic unsaturated hydrocarbons may be of the straight or branched chain types. Generally speaking, the straight chain hydrocarbons having a single double bond at the end of the chain are preferred. Hydrocarbons of this kind may be obtained in any suitable manner, for example, by dehydrating the primary alcohols obtained by hydrogenating fatty acids or their esters, e. g., those contained in palm oil, tallow, coconut oil and olive oil. Branched chain unsaturated hydrocarbons falling within the invention may likewise be obtained in any desirable manner, for example, by polymerizing short chain olefines or by dehydrating synthetic higher alcohols or mixtures thereof, e. g., those produced by the hydrogenation of carbon oxides under elevated temperatures and pressures. Where branched chain hydrocarbons are employed the better results are obtained the shorter the side chain.

Certain of the branched chain compounds are disclosed and claimed in our co-pending application Serial No. 666,062 filed April 13, 1933.

While the oxygen derivative of sulphur employed in accordance with the invention is preferably one of the compounds previously mentioned or mixtures thereof, reaction (I) may also be effected by treating the olefine with relatively concentrated sulphuric acid in the presence of a dehydrating agent with or without a suitable catalyst. If desired, dehydrating agents may be employed in connection with sulphur trioxide, halogen sulphonic acids, oleum, sulphuryl chloride, acetyl sulphuric acid, or mixtures thereof. It is preferable, however, to employ these substances as such rather than in combination with a dehydrating agent. When sulphur trioxide is employed it may be introduced into the reaction mixture either in gaseous, liquid or solid form. Of the halogen sulphonic acids, chlorsulphonic acid and bromsulphonic acid are preferably used.

When substances capable of removing water are employed as above described they should preferably be relatively strong dehydrating agents, such as, for example, acetyl chloride, glacial acetic acid, acetic anhydride, propionic acid, propionic anhydride, phosphorus pentoxide, phosphorus oxychloride and boric anhydride.

The proportions of the oxygen derivative of sulphur employed in carrying out reaction (I) may vary within relatively wide limits depending largely upon the nature of the reactants. In general, it is preferable to employ about one to two moles of the oxygen-sulphur derivative for each double bond per mole of an unsaturated hydrocarbon. In certain cases, however, it may be desirable to use larger or smaller proportions of the oxygen-sulphur compound, it being understood that the desired reaction proceeds whether a small or large amount of sulphur derivative is employed.

As previously indicated, reaction (I) may be effected in a solvent or suspension medium, that is to say a medium which is liquid at the temperature of the reaction and is inert to the reactants or does not affect the reaction unfavorably. As examples of solvent or suspension media we may mention carbon tetrachloride, ethylene dichloride, trichlorethylene, tetrachlorethane, chloroform, liquid sulphur dioxide, diethyl ether, acetic anhydride, propionic acid and propionic anhydride. Generally speaking, we prefer to employ carbon tetrachloride. Solvent or suspension media are especially desirable when sulphur trioxide is the oxygen derivative of sulphur employed.

In practicing the invention we have found that especially desirable results are obtained when reaction (I) is carried out with a halogen sulphonic acid in the presence of a halogenating catalyst. As examples of halogenating catalysts may be mentioned antimony trioxide, antimony pentoxide, antimony trichloride, antimony pentachloride, antimony sulphate, cuprous chloride, cupric oxide, cuprous oxide, cupric sulphate, cupric acetate, manganese dioxide, pyrolusite, manganous sulphate, manganese oxide, ferric chloride, ferrous sulphate, ferric sulphate, ferric oxide, ferrous oxide, magnetite, vanadium pentoxide, sodium vanadate, vanadyl sulphate, aluminum chloride, aluminum sulphate, cuprous iodide, sodium iodide, potassium iodide and free iodine. It will be recognized that the results obtained with the foregoing catalysts may differ widely depending largely upon the specific reactants and the conditions of operation. We have found that the reaction proceeds very smoothly and the final products are exceptionally light in color when reaction (I) is effected with chlorsulphonic acid in the presence of a chlorinating catalyst. Of the various chlorinating catalysts with which we have practiced this preferred embodiment of the invention, the results obtained with pyrolusite and iodine have been very highly advantageous. Good results are also obtained when the reaction between the olefine and the oxygen derivative of sulphur is effected in the presence of a sulfonating catalyst such as boric anhydride or compounds of mercury and silver, e. g. mercuric sulphate, mercurous sulphate, mercurous oxide, mercuric oxide, silver sulphate, silver acetate, and silver oxide. In any case, the catalyst should preferably be soluble in the reaction mixture and furthermore should preferably be a compound which does not give rise to oxidation reactions.

The amount of catalyst employed may vary considerably depending more or less upon the nature thereof and that of the reactants, but as a general rule desirable results have been obtained by the addition of catalysts to the reaction mixture in proportions corresponding to about 0.1–5.0% by weight of the reacting substances.

The time allowed for reaction (I) to take place will depend largely upon the nature of the reactants, the catalyst and the conditions of temperature. Under ordinary operating conditions it may vary from about 2 to 48 hours. If no catalyst is employed this first reaction may be carried on almost indefinitely. In this case, therefore, it is customary to determine the optimum time empirically by allowing the reaction to proceed until further treatment with the oxygen-sulphur derivative has little if any effect on the result obtained. When a catalyst is employed, reaction (I) is ordinarily allowed to proceed until a sample of the product boiled with a hydrolyzing agent is soluble in water.

While the temperature maintained in effecting reaction (I) may vary within relatively wide limits, the temperature employed should preferably be below that giving rise to decomposition of the reactants and products. In general, it is preferable to maintain the temperatures in this step of the process below about 50° C. and preferably within the range of about $-10°$ to $+30°$ C. Ordinarily, higher temperatures tend to yield darker products.

The treatment of the product from reaction (I) to effect hydrolysis thereof (reaction II) may be carried out in a number of ways. Thus, water may be added until the acid concentration is relatively low, and the resultant product boiled; or the product from reaction (I) may be neutralized and then heated with a hydrolyzing agent. In some cases, it may be possible to effect hydrolysis at least in part by merely neutralizing the product from reaction (I) with an aqueous alkaline reagent and then boiling the resultant product. Hydrolyzing agents which are suitable for the practice of the invention are mineral acids, e. g., hydrochloric, sulphuric and the like, or alkaline reagents, e. g., alkali metal and alkaline earth metal hydroxides. In practice, we prefer to neutralize the product of reaction (I) with an aqueous solution of an alkali metal hydroxide, preferably sodium hydroxide, and add a further quantity of the alkali metal hydroxide as a hydrolyzing agent.

The amount of the alkaline reagent employed for neutralization and hydrolysis of the product from reaction (I) should preferably correspond to at least one equivalent for every equivalent of the oxygen-sulphur compound used. Thus, if one mole of sulphur trioxide is employed in reaction (I), neutralization and hydrolysis of the product may be effected with two moles of sodium hydroxide. In general, it is preferable to use an excess of the alkaline reagent over the amount required for neutralization and hydrolysis. The amount of water present during the hydrolysis may vary widely. Very satisfactory results are obtained, however, when the product of reaction (I) is heated with solutions of mineral acids, alkali metal hydroxides or alkaline earth metal hydroxides having concentrations of about 2–20%.

The temperature of the hydrolysis is subject to considerable variation but should preferably be above 50° C. and below the temperature at which the reactants or products decompose. A temperature of about 100° C. is normally satisfactory. If a solvent or suspension medium is used in reaction (I), it is preferably removed prior to or during the hydrolysis by evaporation, steam distillation, or in any other suitable manner.

When no catalyst is employed in reaction (I), the hydrolysis in reaction (II) is preferably continued until the immiscible oil ceases to form in the reaction product. When reaction (I) is effected in the presence of a catalyst, the time allowed for hydrolysis is preferably determined by allowing the hydrolytic action to proceed until a sample of the product dissolves in water.

It will be understood that the oxygen derivatives of sulphur employed in reaction (I) are not equivalents. Thus, the products obtained by reacting unsaturated aliphatic hydrocarbons with chlorsulphonic acid contain chlorine while those obtained from the reaction of oleum with unsaturated aliphatic hydrocarbons contain no halogen. Sulphuryl chloride which contains only two oxygen atoms combined with a sulphur atom differs in many respects from sulphur trioxide, oleum, and the halogen sulphonic acids.

Products of some value as emulsifying agents may be obtained by reacting the unsaturated aliphatic hydrocarbons with an oxygen derivative of sulphur as above described with or without a catalyst and then merely neutralizing the reaction mass without hydrolyzing it. These intermediate products may also possess some wetting and detergent power particularly if relatively short chain unsaturated hydrocarbons are employed. In general, however, these products are insoluble or only slightly soluble in water.

The final products produced in accordance with the invention, on the other hand, are soluble in water. Furthermore, they are highly surface active and possess excellent cleaning, wetting and dispersing properties. They are particularly valuable from a commercial standpoint because of their stability in all kinds of acidic, alkaline and neutral aqueous media and are distinguished from any products previously prepared by their stability in strong acids and alkalies. Because of these characteristics our new products have an unusually wide application for industrial purposes. Since they may be used in acid, neutral or alkaline baths they are especially well adapted for the laundering, dyeing, bleaching, carbonizing, mercerizing and finishing of textiles. They are also well adapted for use as emulsifying and solubilizing agents for water immiscible or only slightly miscible solvents. They may be employed as such or in combination with water miscible or immiscible alcohols, ketones or other additional materials, such as washing, cleansing, emulsifying and wetting agents, e. g. trisodium phosphate, Turkey red oils, soaps, aliphatic or aromatic sulphonic acids, such as alkylated naphthalene sulphonic acids, mineral oil sulphonic acids, sulphonated derivatives of abietic acid, sulphuric esters, saponin and aliphatic aromatic acid amides, such as sodium taurocholate or sodium salts of analogous acid amides. When employed alone or in combination with other materials such as those mentioned above they find wide application as pasting, cleansing, lathering, wetting or fulling agents in the dye, paper, textile and leather industries. The products of the invention may also be employed in combination with neutral acid or basic salts which serve to increase their emulsifying, wetting and dispersing power, such as, for example, sodium sulphate, sodium chloride, sodium acetate, mono-, di- and tri-sodium phosphates, sodium carbonate, sodium bicarbonate, similar compounds of the other alkali metals or of ammonium. Other additional materials with which the products of the invention may be combined are bleaching and disinfectant agents such as persulphates, percarbonates and perborates; filling materials such as talc, marble-dust, starch; adsorbing materials such as suitable clays, e. g. fuller's earth; protective colloids or dispersing agents such as gum tragacanth, gall acids and their derivatives, agar agar, glue, methyl cellulose, sulphite cellulose lyes, sodium cellulose phthalate, calcium saccharate, albumin, sodium cellulose glycollate, gelatin, natural and artificial resins, derivatives of cholesterinl, phosphatides, gelloses, natural and artificial waxes, wool waxes, solvent and softening agents, organic bases and their salts such as alkylolamine salts and quaternary ammonium compounds, inorganic colloids, and alkalies; and scouring materials such as kieselguhr, powdered pumice, sulphur, flour, china clay salt and the like. Desirable results for many purposes may also be obtained by employing the sulpho acids or salts thereof produced as herein described in combination with the various acyclic, monocyclic, or complex cyclic terpenes or derivatives thereof such as, for example, limonene, dipentene, terpinolene, terpinene, phellandrene, sylvestrene, pinene, bornylene, sabinene and their acoholic, ketonic and aldehydic derivatives. It will be apparent, furthermore, our new products may be combined with a wide variety of other additional materials which possess washing, cleansing, emulsifying, wetting, dispersing, adsorbing, lathering, bleaching, germicidal and bactericidal powers. They may likewise have incorporated therewith artificial or natural perfuming substances, many of which in themselves may possess detergent properties of some value.

In addition to the advantages above enumerated the invention is further advantageous in that it offers a large outlet of cheap raw material such as oils and fats from natural sources and those obtainable in large quantities as by-products from the textile, and leather industries from fish oils, and a large number of other sources. Moreover, many of these by-products have been of relatively little value or usefulness heretofore because of the bad odor associated therewith. By converting these raws materials to olefines for use in the present process odor ceases to be a serious factor.

In the practical application of the products of the invention it has been noted that as a general rule their wetting properties increase with the number of carbon atoms in the unsaturated hydrocarbon employed up to about 18 carbon atoms and thereafter decrease. It has also been noted that the detergent properties of the product may vary within a relatively wide range depending largely upon the number of carbon atoms therein and the nature of the liquid in which they are employed. Thus, in soft water the detergent power increases with the number of carbon atoms in the starting material and the products prepared from unsaturated hydrocarbons containing about 20-30 carbon atoms are especially desirable. In hard water, on the other hand, products prepared from unsaturated aliphatic hydrocarbons containing less than 20 but more than about 10 carbon atoms are preferred from the standpoint of detergent power, and those prepared from the unsaturated straight chain hydrocarbons containing about 14 to 16 carbon atoms are particularly advantageous.

While the invention is not limited to any theory as regards the mechanism of the reactions, it appears that the treatment of the olefine with the oxygen-sulphur derivative without a catalyst gives rise to several reactions which proceed practically side by side so that a mixture of several substances is produced. On the other hand, when a suitable catalyst is employed, instead of several reactions occurring the directing influence of the catalyst causes one reaction to occur to the exclusion or practically to the exclusion of the other.

It will be apparent from the description of the invention that the processes employing a catalyst are distinctly advantageous over those in which no catalyst is employed, more particularly in the elimination of one step, viz., the separation of the oil after hydrolysis, and in the unprecedently high yields.

While the constitution of the products obtained after sulphonation and hydrolysis cannot be stated with certainty, it is believed that the final products may be represented by the following general formula:

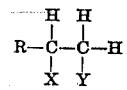

wherein R represents an aliphatic hydrocarbon residue, containing six or more carbon atoms, X represents an —OH group when Y represents a sulphonic acid residue (including —SO₃H, —SO₃Na,—SO₃K and the like), and Y represents an —OH group when X represents a sulphonic acid residue. Thus, the products may be isomeric mixtures of the compounds

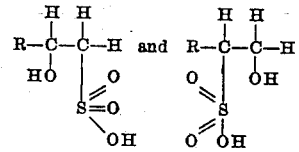

or under certain conditions of sulphonation, e. g., in the use of a catalyst with specific sulphonating agents, it is possible that one of these compounds may be produced practically to the exclusion of the other.

Throughout the specification and claims, it will be understood that the oxygen derivatives of sulphur which are employed in accordance with the invention are sulphonating agents; that is, they are capable of introducing a sulphonic acid residue into the unsaturated hydrocarbon at the unsaturated bond. The expression "treatment with a hydrolyzing agent" is intended to cover a hydrolytic treatment capable of removing acid residues other than sulphonic acid residues from the sulphonated hydrocarbon. By a "suitable catalyst for the sulphonation reaction" is meant a sulphonating catalyst with a strong sulphonating agent, such as, for example, oleum, sulphur trioxide, chlorsulphonic acid, acetyl sulphuric acid and the like, or a halogenation catalyst with a halogen sulphonic acid, such as, for example, chlorsulphonic acid.

As many apparent and widely different embodiments of this invention may be made without departing from the spirit thereof, it is to be understood that we do not limit ourselves to the foregoing examples or description except as indicated in the following claims.

We claim:

1. The process for the production of assistants for the textile and related industries which comprises acting on a branched chain olefine containing at least eight carbon atoms and one double linkage at the end of the chain, with a strong liquid sulphonating agent, and treating the product with an alkaline hydrolyzing agent.

2. Surface active substances of the class consisting of hydroxy sulphonic acids and sulphonates in which a hydroxy group and a sulphonic acid radical are attached to the last two carbon atoms of a branched chain aliphatic hydrocarbon containing at least eight carbon atoms.

3. Surface active substances of the class consisting of hydroxy sulphonic acids and sulphonates of branched chain aliphatic hydrocarbons corresponding to the primary alcohols produced by the hydrogenation of carbon oxides under elevated temperatures and pressures, said branched chain hydroxy sulphonic acid derivatives having the hydroxy group and the sulphonic acid radical on the last two carbon atoms of the chain.

FREDERICK B. DOWNING.
RICHARD G. CLARKSON.